United States Patent
Hudson

[11] 3,883,223
[45] May 13, 1975

[54] COUPLER FOR OPTICAL COMMUNICATION SYSTEM

[75] Inventor: Marshall C. Hudson, Corning, N.Y.

[73] Assignee: Corning Glass Works, Corning, N.Y.

[22] Filed: Apr. 8, 1974

[21] Appl. No.: 458,786

[52] U.S. Cl. ........ 350/96 C; 350/96 B; 350/96 WG
[51] Int. Cl. ............................................. G02b 5/16
[58] Field of Search............ 350/96 B, 96 C, 96 WG

[56] References Cited
UNITED STATES PATENTS
3,814,081   6/1974   Mori.............................. 350/96 B X Primary Examiner—David H. Robin
Attorney, Agent, or Firm—William J. Simmons, Jr.; Walter S. Zebrowski; Clarence R. Patty, Jr.

[57] ABSTRACT

A coupler for coupling an optical signal propagating in any one of a plurality of optical signal transmission lines to all of the remaining transmission lines. Support means disposes the end portions of the transmission lines in a bundled, parallel arrangement in such a manner that the optical waveguides of which the transmission lines are comprised terminate in a planar bundle endface that is substantially perpendicular to the axis of the transmission line bundle. A concave reflective surface having a curvature that is parabolic, spherical, or the like, is spaced from the bundle endface so that light radiating from any transmission line is reflected from the reflective surface into all of the remaining transmission lines in the bundle.

6 Claims, 4 Drawing Figures

3,883,223

COUPLER FOR OPTICAL COMMUNICATION SYSTEM

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines or merely transmission lines which may consist of a single optical waveguide or a group thereof which is usually referred to as a bundle or a cable. Optical waveguides normally consist of an optical fiber having a transparent core surrounded by a layer of transparent cladding material having a refractive index which is lower than that of the core. Although the theory of optical waveguides has been known for some time, practical optical waveguides that do not absorb an excessive amount of transmitted light have been developed only recently. For example, U.S. Pat. No. 3,659,915 discloses a low loss optical waveguide comprising a cladding layer of fused silica and a core of fused silica doped with one or more materials that selectively increase the index of refraction of the core above that of the cladding. Other configurations of optical waveguides include multiclad fibers and fibers having a gradient refractive index.

To establish an optical communication network between a controlling station or central processing unit (CPU) and a plurality of subscriber stations, a variety of interconnection schemes may be utilized. The CPU can be "hard wired" to the subscriber stations, but when many subscriber stations exist, the excessive amount of transmission line required causes this method to be undesirable due to both the cost of the transmission line and the space consumed thereby. A loop data bus may be employed, thereby drastically reducing the required amount of transmission line, but the large number of couplers required in such a system introduces an excessive amount of loss, especially in those systems in which there are many subscriber stations.

The optical communication network disclosed in copending patent application Ser. No. 376,575 entitled "Optical Communication System" filed by F. L. Thiel and R. E. Love on July 5, 1973 takes advantage of unique properties of optical signal transmission lines and enables the interconnection of a plurality of stations with much less transmission line than that which would be required by hard wiring, and yet it is not plagued by the excessive losses encountered in the aforementioned loop data bus. In accordance with the invention disclosed in that application, a plurality of stations, including the CPU, are connected by separate transmission lines to a common passive coupler which is adapted to receive an optical signal from any one of the stations and couple a portion of that signal to the transmission line associated with each of the other stations.

A coupler designed for use in the optical communication network disclosed in said application Ser. No. 376,575, is disclosed in U.S. patent application Ser. No. 376,581 filed in the name of F. L. Thiel on July 5, 1973. That coupler comprises an elongated cylindrically shaped rod of transparent material having first and second endfaces that are substantially perpendicular to the axis thereof, the second endface having a light reflecting layer disposed thereon. Support means disposes the ends of the transmission lines in a bundled arrangement in such a manner that the optical waveguides of which the transmission lines are comprised terminate adjacent to the first endface of the rod, the axes of the waveguides being substantially parallel to the longitudinal axis of the rod. Although this coupler functions to couple the signal in any one of the plurality of optical signal transmission lines to all of the remaining transmission lines, the coupling is not sufficiently uniform.

SUMMARY OF THE INVENTION

It is therefore an object of the present invention to provide a low loss light coupler for uniformly coupling an optical signal propagating in any one of a plurality of optical signal transmission lines to all of the remaining transmission lines.

Briefly, the present invention relates to a passive coupler for use in an optical communication system having a plurality of optical signal transmission lines each comprising at least one optical waveguide. The coupler, which functions to couple a portion of the optical signal propagating in any one of the transmission lines to each of the remaining transmission lines, comprises support means for disposing the end portions of the optical signal transmission lines in a parallel bundled arrangement. The optical waveguides of which the optical transmission lines are comprised terminate in faces that are disposed in a substantially planar array, thereby constituting a transmission line bundle endface. Concave light reflecting means, which is spaced from the endface, is so disposed with respect to the endface that a portion of the optical signal radiating from any one of the optical signal transmission lines reflects from the reflecting means back into each of the remaining optical signal transmission lines.

DESCRIPTION OF THE PREFERRED EMBODIMENTS

Figure 1:
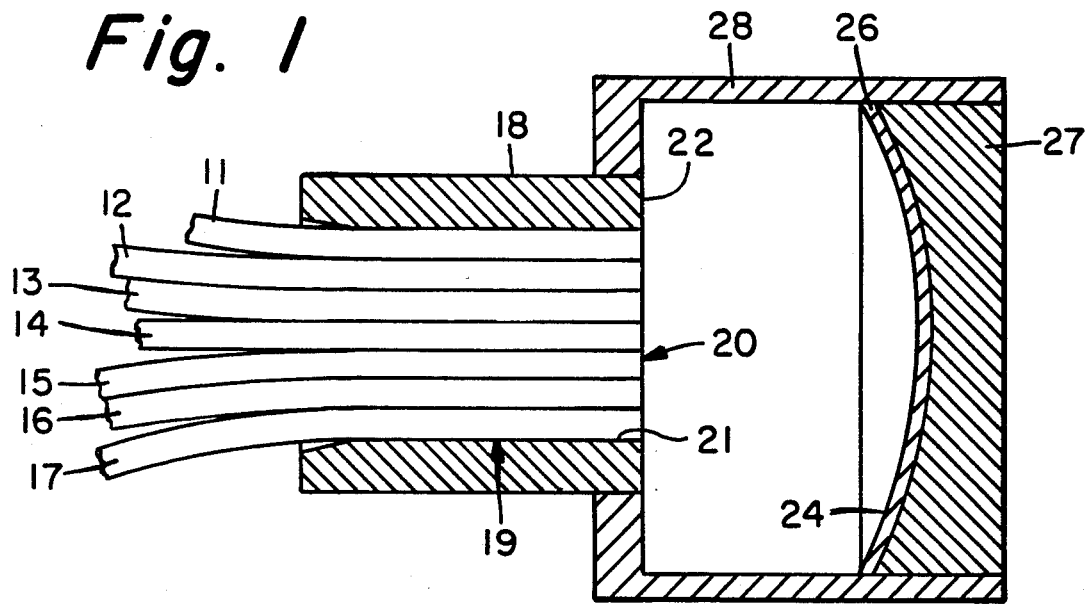
FIG. 1 is a cross-sectional view of a preferred embodiment of the present invention.

FIG. 1 is a cross-sectional view of a passive optical signal coupler used for interconnecting a plurality of optical signal transmission lines 11 through 17. This coupler consists of support means 18 for maintaining the end portions of transmission lines 11 through 17 in a parallel, bundled array 19, the endface 20 of which is substantially perpendicular to the axes of the transmission line end portions. Support means 18 may consist of a ferrule having a cylindrical aperture 21 therein which is tapered at one end to facilitate insertion of the transmission lines. Aperture 21 may have any suitable cross-sectional configuration such as circular, hexagonal, or the like. After the transmission lines are inserted into the ferrule, they may be secured in place by a suitable bonding material such as epoxy, or the bundles may be retained in the ferrule by crimping or clamping means known in the connector art. The transmission lines may initially extend through aperture 21 and beyond ferrule endface 22. The protruding ends of the transmission lines are cut off, and endface 22 and the corresponding ends of the fibers are ground down with grinding paper. It is therefore preferred that ferrule 18 be made of glass, brass or some other material that has grinding characteristics similar to those of the optical waveguide material. The ends of the transmission lines thus lie in the plane of the ferrule endface 22 which is preferably substantially perpendicular to the longitudinal axis of aperture 21.

Figure 2:
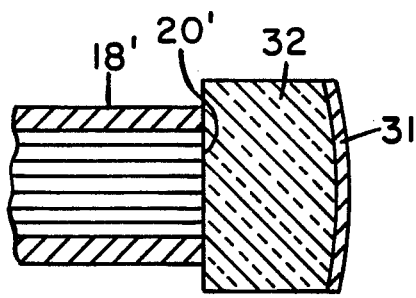
FIG. 2 is a cross-sectional view of another embodiment.

A concave light reflecting surface 24, which is symmetrical about the longitudinal axis of bundled array 19, is spaced from endface 20. Surface 24 may consist of a layer 26 of reflecting material disposed on a curved surface of a substrate 27 which is remotely disposed with respect to endface 20 by support bracket 28. As illustrated in FIG. 2, wherein elements similar to those illustrated in FIG. 1 are indicated by primed reference numerals, the light reflecting surface may consist of a layer 31 of reflecting material disposed upon the curved surface of a body 32 of transparent material that is disposed between layer 31 and endface 20'. In this latter embodiment, a layer of index matching fluid may be disposed between transparent body 32 and endface 20'.

Figure 3:
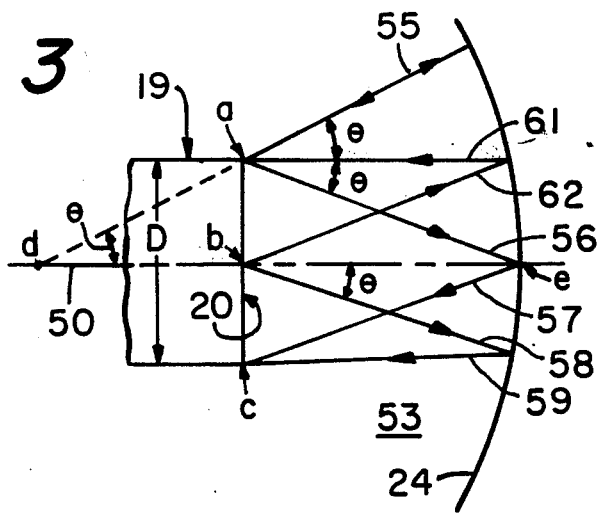
FIG. 3 is a diagram that is useful for calculating the dimensions of the coupler of the present invention.

For proper coupler operation, a portion of the optical signal propagating in all of the optical waveguides in any one of the optical signal transmission lines 11 through 17 must be coupled to each of the optical waveguides in each of the remaining transmission lines. Reference is made to FIG. 3 which shows a diagram that is useful in calculating the coupler dimensions. The distance D is that greatest distance across transmission line bundle 19; e.g., it is equal to the diameter of a circular array of transmission lines or the distance between two opposing apices of a hexagonal array. Points $a$ and $c$ are opposed, peripherally disposed points on endface 20, and point $b$ is the midpoint of line $ac$. Broken line 50 is the axis of reflective surface 24 as well as that of bundled array 19. The angle $\theta$ is the meridional acceptance angle of the optical waveguides in medium 53 which is disposed between concave reflecting surface 24 and endface 20. The dimensions and curvature of reflecting surface 24 and the distance between it and endface 20 must be such that light radiating from any given waveguide fiber illuminates all other fibers. This condition is satisfied if light radiating from an optical waveguide terminating at point $a$ reflects from surface 24 back to waveguides disposed at points $a$ and $c$, and if light radiating from a waveguide disposed at point $b$ reflects from surface 24 back to waveguides disposed at points $a$ and $c$. Reflective surfaces suitable for use in the coupler of the present invention are those, whose cross-sections in a plane passing through the reflector axis, are defined by the equation $$y = (4px)^{1/2}[1 - 1 - kx)^{1/2}] \quad (1)$$

where $k$ is given by $$-1/(2p) \leq k \leq 1/(2p)$$

and $p$ is the distance between point $b$ and point $e$, the intercept of axis 50 with reflector surface 24, this distance being determined by the equation $p = D/(2 \tan \theta)$. The distance between the bundle endface and reflector can deviate slightly from the value $p$ with no detrimental effects. It is well known that acceptance angle $\theta$ is defined by the equation $$\theta = \sin^{-1} \sqrt{(n_1^2 - n_2^2)/n_0}$$

where $n_1$ and $n_2$ are the refractive indices of the waveguide core and cladding, respectively, and $n_0$ is the refractive index of the surrounding medium 53.

Equation (1) defines a family of conic sections, some of which are commonly employed as light reflecting surfaces. The cross-sections of some of the more common reflector surfaces can be obtained by selecting proper value of $k$ in equation (1). For example, when $k$ is set equal to 0, equation (1) simplifies to $y = (4px)^{1/2}$, which defines the cross-sectional shape of a paraboloid, the focus being at point $p$. Setting $k$ equal to $1/4p$ results in the equation $y = (4px - x^2)^{1/2}$, which defines the cross-sectional shape of a spherical reflector, the center of which is located at $2p$. For the positive extreme value of $k = 1/(2p)$, equation (1) becomes $$[(x - 2p)^2/(2p)^2] + [y^2/(2\sqrt{2}p)^2] = 1$$

The cross-sectional shape of an ellipsoid reflector. For the negative extreme value of $k = -1/(2p)$, equation (1) becomes $$2(x + 2p)^2 - y^2 = 8p^2$$

which defines the cross-sectional shape of a hyperboloid reflector.

Figure 4:
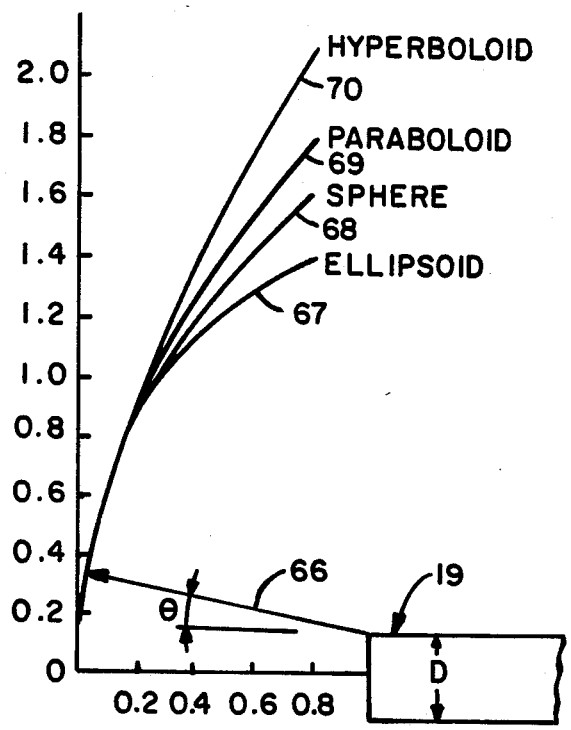
FIG. 4 is a graph illustrating four reflector curvatures which may be employed in this invention.

The four specific cross-sectional shapes that have been derived hereinabove are plotted in FIG. 4. In this figure the distance $p$ is chosen to be 1.0 and the angle $\theta$ is chosen to be 12°, which is presently about the maximum acceptance angle for low loss optical waveguides. Even in the case wherein light radiates from a peripherally disposed waveguide, as illustrated by ray 66, it intercepts curves 67 through 70 at points relatively near the reflector axis. The value of $x$ at this point is about 0.05 in this illustration. The difference in slope between the extreme curves 67 and 70 at this value of $x$ is only about 8 percent. Thus, for values of $\theta$ 12°, all curves defined by equation (1) provide essentially the same light reflecting properties, since all curves in this family are nearly superimposed in that area.

Reference is again made to FIG. 3 for a discussion of two specific embodiments of the present invention wherein the curvature of surface 24 is either spherical or parabolic. A spherical reflector will be discussed first. To meet the previously stated conditions, an extreme ray represented by line 55, which radiates from a waveguide disposed at point $a$, should return to point $a$. The coupler is therefore designed so that line 55 is located on a radius of spherical reflector 24. Another extreme ray represented by line 56, which is radiated from that waveguide which is disposed at point $a$, must reflect from reflector 24 and return to point $c$ as indicated by the ray represented by line 57. Such a reflection will occur since reflector 24 is symmetrical about axis 50, and the reflector surface is perpendicular to axis 50 at point $e$. Applying geometric principles, it can be determined that the distance $p$ between points $b$ and $e$ is equal to $D/(2 \tan \theta)$. For a spherical reflector, triangle ade is an equilateral triangle, and the distance $db$ is equal to the distance $be$ or $p$. Since point $d$ is the center of the spherical reflecting surface, the radius R of the surface is equal to $2p$ or $D/\tan\theta$. Since extreme rays 55 and 56 reflect back to diametrically opposed peripherally disposed waveguides, some portion of the light radiated from the waveguide disposed at point $a$ will reflect from reflector 24 and impinge upon those waveguides disposed along endface 20 between points $a$ and $c$. Finally, an extreme ray emitted from a waveguide disposed at point $b$, which is located on axis 50, must be substantially reflected back to point $c$ along lines 58 and 59. If, for example, the distance D were 50 mils, and the acceptance angle $\theta$ of the optical waveguides of which the transmission lines are comprised were 8°, the ray reflecting from surface 24 would impinge upon endface 20 at a point that is about 0.2 mil away from point $c$. Thus, the extreme ray from a waveguide terminating at point $b$ would provide substantial illumination of a waveguide terminating at point $c$.

If the light reflecting surface 24 is parabolic, endface 20 should be centered at the focal point of the parabolic surface, and the distance $p$ between points $b$ and $e$ should equal $D/(2 \tan \theta)$. For a parabolic reflector that is symmetrical about axis 50, ray 56 will again reflect back to point $c$. The axial ray radiated from the waveguide disposed at point $a$, which is represented by line 61, will be parallel to the axis of the parabolic reflector and will therefore reflect back to point $b$, the focal point, as indicated by line 62. However, since surface 24 is parabolic, the ray represented by line 55 will not return to exactly the same point from which it was emitted. For example, for a 50 mil diameter bundle of optical signal transmission lines comprising waveguides having an acceptance angle of 8°, ray 55 will reflect from surface 24 and return to endface 20 about one half mil away from point $a$.

There appears to be some advantage in using a spherical reflecting surface rather than a parabolic reflecting surface from the standpoint of uniformity of illumination as well as ease of fabrication. However, for the purpose of practicing the present invention, any light reflecting surface could be employed which has a curvature such that light from any optical waveguide in bundle 19 is reflected and substantially illuminates the remaining waveguides therein.

I claim:

1. In an optical communication system having a plurality of optical signal transmission lines each comprising at least one optical waveguide having an acceptance angle $\theta$, a coupler for coupling a portion of the optical signal propagating in any one of said transmission lines to each of the remaining transmission lines, said coupler comprising support means for disposing the end portions of said optical signal transmission lines in a parallel bundled array having a maximum cross-sectional dimension D, the optical waveguides of which said transmission lines are comprised terminating in faces that are disposed in a substantially planar array, thereby constituting a transmission line bundle endface, and concave light reflecting means spaced from said endface and being so disposed with respect to said endface that a portion of the optical signal radiating from any one of said optical signal transmission lines reflects from said reflecting means back into each of the remaining optical signal transmission lines, said reflecting means being symmetrical about an axis that passes through the center of said array, said reflecting means including a light reflecting surface, the cross-sectional shape of which is given by the equation $$y = (4px)^{1/2}(1 - kx)^{1/2}$$

where $k$ is given by $$-1/(2p) \leq k \leq 1/(2p)$$

and $p$ is determined by the equation $$p = D/2 \tan \theta$$

said acceptance angle $\theta$ being an angle up to 12°.

2. An optical communication system in accordance with claim 1 wherein said concave light reflecting means is a spherically shaped light reflecting surface, the radius R of said surface being equal to $2p$ and the axial distance between said endface and said surface being equal to $p$.

3. An optical communication system in accordance with claim 1 wherein said concave light reflecting means is a parabolically shaped light reflecting surface having a focal point disposed a distance $p$ from said reflecting surface, and wherein said endface lies on said focal point.

4. An optical communication system in accordance with claim 1 wherein said concave light reflecting means is in the shape of a hyperboloid.

5. An optical communication system in accordance with claim 1 wherein said concave light reflecting means is in the shape of an ellipsoid.

6. An optical communication system in accordance with claim 1 wherein the distance between said bundle endface and the center of said light reflecting means is equal to $p$.

* * * * *